United States Patent Office 2,972,594
Patented Feb. 21, 1961

2,972,594
PROCESS FOR THE MANUFACTURE OF FINELY DIVIDED METAL SILICATES

Chester L. Baker, Narberth, and John Frankle Austin, Philadelphia, Pa., assignors to Philadelphia Quartz Company, Philadelphia, Pa., a corporation of Pennsylvania No Drawing. Filed Mar. 11, 1958, Ser. No. 720,541

13 Claims. (Cl. 260—41.5)

This invention generally relates to the manufacture of finely-divided metal silicate products and it comprises a process for producing a finely-divided product containing a metal silicate and frequently also containing metal oxide and/or silica in finely-divided form, said process comprising mixing an aqueous solution of certain sodium silicates with a highly-soluble mono-monovalent salt of an alkali metal as a coacervating agent and mixing in as an insolubilizing agent a metal compound capable of forming an insoluble silicate in an amount sufficient to precipitate at least a substantial part of the silica in a mixture and recovering the finely divided precipitate thereby produced.

PRIOR ART METHODS

There are many industrial applications of finely divided inorganic materials and a large number of procedures have been developed for the production of such materials. Grinding is, of course, the most widely used and on the whole one of the most satisfactory methods of obtaining finely divided materials. But grinding to any high degree of fineness requires the expenditure of a large amount of power and this factor usually renders the method impractical when a fineness of the order of about 1 micron or below is desired. Various other methods have been suggested for the production of fine particles, such as chemical reactions in the vapor phase, chemical precipitating methods, subliming methods, condensations from the vapor phase, methods involving gelatin, etc. Most of these methods are expensive, however, and others have drawbacks which render them unattractive. In spite of these unfavorable features, however, several of these auxiliary methods have been used commercially owing to the great demand for pigments, fillers, delustering agents and the like.

RELATED PATENT APPLICATIONS

This application is a continuation-in-part of our co-pending application, Serial No. 293,846 now abandoned, filed on June 16, 1952 and our application, Serial No. 763,444, filed on July 24, 1947 and now abandoned. In these prior applications we described the methods of obtaining finely divided solids by treating various inorganic colloidal solutions, such as solutions of sodium silicate, with coacervating agents and insolubilizing agents. The claims in application Ser. No. 763,444 were eventually limited to the production of finely divided silica from colloidal silicate solutions by the use of acidic materials as insolubilizing agents, although the use of metal compounds capable of forming insoluble silicates was originally described and illustrated by several specific examples. This latter subject matter was included in application Ser. No. 293,846 which has now been limited to the use of ammonia as a coacervating agent. The term mono-monovalent salt as used herein is intended to be synonymous with the term uni-univalent as used in the prior applications.

In our co-pending application, Serial No. 292,936, now abandoned, filed June 11, 1952, and which is also a continuation-in-part of S.N. 763,444, we described more specifically how it is possible to obtain fine silica in particle sizes ranging down to about 7 millimicrons by the use of special mixing techniques and control of the conditions of the process. These mixing techniques and controls are also applicable to the production of the metal silicate products of the present invention and are required when the finest particle sizes are desired.

THE INVENTION BROADLY

The present invention relates to a novel method of forming finely divided particles of metal silicates which may also contain finely divided silica and metal oxide particles in addition to the metal silicate particles, the particle size of these products ranging from a few microns down to about 7 millimicrons. The method is generally applicable to the production of a wide range of finely divided metal silicates which are insoluble in aqueous solution. The method usually produces amorphous particles, the bulk of which are spherical and which are characterized by their unusual softness but in some cases crystalline particles are produced. The method broadly involves the reaction of certain sodium silicates, mono-monovalent salts of alkali metals (as coacervating agents) and specified insolubilizing agents. More particularly, our process comprises mixing an aqueous solution of sodium silicate having a weight percent ratio of $Na_2O$ to $SiO_2$ within the range of from about 2:1 to 1:4 and a concentration of $SiO_2$ ranging from about 1 to 30% by weight with a highly soluble mono-monovalent salt of an alkali metal as a coacervating agent in a quantity and under conditions tending to produce a state of incipient coacervation at the moment of precipitation, the latter state being indicated by the first appearance of a faint opalescence in the final mixture, or producing a substantially saturated solution of the mono-monovalent salt in the sodium silicate solution or producing a minimum ionic strength of from 0.15–0.4 depending on the content of $SiO_2$ ranging from 1.2 to 10%, mixing in as an insolubilizing agent a metal compound capable of forming an insoluble silicate in an amount sufficient to precipitate at least a substantial part of the silica in the mixture and recovering the finely divided precipitate thereby produced; the insolubilizing agent being mixed with the sodium silicate no earlier than the mono-monovalent salt coacervating agent is mixed therewith and under conditions maintaining the environmental conditions substantially uniform during the formation of a precipitate, whereby a substantially gel-free precipitate is obtained, as will be more fully set forth hereinafter.

THE SODIUM SILICATE SOLUTION

According to the above method the sodium silicate solution should have a concentration of $SiO_2$ ranging from about 1 to 30% by weight and a weight percent ratio of $Na_2O$ to $SiO_2$ within the range of from about 2:1 to 1:4. The higher concentrations of $SiO_2$ are employed with the higher ratios of $Na_2O$ to $SiO_2$. For the production of particle sizes below about 20 millimicrons ($m\mu$) in diameter, the concentrations of $SiO_2$ in the final mixture should be within the range of from about 1.2 to 10% by weight and the ratio of $Na_2O$ to $SiO_2$ in the silicate solution should be within the range of from about 1:2.4 and 1:4.

THE MONO-MONOVALENT SALTS

A mono-monovalent salt is one in which both the cation and anion exhibit a valency equivalent to that of hydrogen which is univalent. Among the mono-monovalent salts of the alkali metals which have been successfully used as coacervating agents in our new process, there may be mentioned sodium chloride, potassium chloride, sodium nitrate, sodium thiocyanate, sodium chlorate, sodium acetate, and sodium formate. We prefer the halides but any highly soluble mono-monovalent salt of an alkali metal (lithium, sodium, potassium, caesium and rubidium) may be used. Where the solubility is somewhat low, it may be necessary to raise the temperature in order to get coacervation with some of these salts. For instance, a composition of 4.3% of sodium thiocyanate, 16.5% of water and 79.3% of a sodium silicate having a weight percent ratio of $1Na_2O$ to $3.22SiO_2$ containing 8.9% of $Na_2O$ could be caused to coacervate by heating to 90–100° C. Similarly, a solution containing 10% of sodium nitrate and 25.7% of water with 64.3% of a sodium silicate solution having a weight percent ratio of $1Na_2O:3.4SiO_2$ and containing 8.3% of $Na_2O$ could be caused to coacervate at 55–60° C. but not lower. The effect of temperature is also shown using the same silicate as in the thiocyanate example but with sodium chloride instead of thiocyanate. At room temperature 3% of sodium chloride caused the silicate to coacervate while only 2% was required at 95° C. When the ratio of the silicate was changed to 2.5, 4% of NaCl was required for coacervation at a temperature of 104° C. The quantity of the mono-monovalent salt of an alkali metal coacervating agent added is usually sufficient to form what might be called a protocoacervate, i.e. a solution in a state of incipient coacervation, as a minimum, but it may be added in a quantity sufficient to produce considerable coacervation of the solution. The mono-monovalent salt is usually added as a saturated solution or a saturated solution containing excess crystals in such quantity that the final solution containing the insolubilizing salt under equilibrium conditions will be at the point of incipient coacervation or have an ionic strength of about 0.15 to 0.4 depending on the concentration of silica in the final solution. This usually means producing a substantially saturated solution of a mono-monovalent salt.

The quantity of mono-monovalent salt of the alkali metal to be used in any given case can be estimated by a rather simple test. If the mono-monovalent salt is added slowly in measured quantities to the sodium silicate solution diluted to its final homogeneous concentration and with a sufficient time interval between additions to permit equilibrium conditions to be substantially reached between additions, a point will be found at which a faint opalescense will become visible. This quantity of mono-monovalent salt coacervating agent can be called 100% for comparative purposes. We have found that it is usually possible to vary the quantity of the mono-monovalent salt used in our process from slightly below 100% up to a maximum of about 500% expressed in terms of the quantity required to produce the first appearance of opalescense when added under equilibrium conditions. When an excess, i.e. over 100%, is added the time of addition of the isolubilizing agent and the mixing conditions must be carefully controlled. Rapid mixing must be used.

The particle size of the final product can be controlled by the amount of mono-monovalent salt added. This is usually found by experiment but other factors being equal the less the amount of mono-monovalent salt employed, the finer the particles in the resulting product, provided, of course, that sufficient mono-monovalent salt is present to avoid the development of a gel.

It is recognized that some mixed mono-divalent salts such as sodium sulfate have a tendency to cause coacervation. These are not as satisfactory as the mono-monovalent salts but may be present in mixtures with mono-monovalent salts and must be taken into account in the coacervating action.

Also mixtures of mono-monovalent salts such as some natural brines would obviously be useful for the purpose of this invention. For instance, a known brine has a composition of 16.4% NaCl, 4.9% $Na_2CO_3$, 6.9% $Na_2SO_4$, 4.7% KCl and 1.5% $Na_2B_4O_7$ and the rest water. The effect of such a brine would depend on the overall ionic strength of the combination of ions it contains.

THE INSOLUBILIZING AGENT

The insolubilizing metal compound must be soluble in water and as stated previously, it must form an insoluble silicate when mixed with silicate solutions. It is usually an electrolyte. It may be a salt, oxide or hydroxide of any metal from which insoluble silicates can be formed in the wet way or whose metal ions precipitate insoluble metal silicates from aqueous silicate solutions. At least 25 metals are known whose ions are capable of precipitating insoluble silicates from aqueous solution and any compound of these is operative which is more soluble in water than the corresponding metal silicate. A simple test for the operativeness of an insolubilizing agent with the mono-monovalent salt coacervating agent and silicate solution is to mix the three simultaneously. If a precipitate is formed in the resulting mixture, the insolubilizing agent also will be found to produce a finely divided precipitate when added to a coacervate formed from the silicate solution and the mono-monovalent salt coacervating agent.

Among the various possible insolubilizing agents which can be used in our process we consider the alkaline earth metal oxides and hydroxides, such as the oxides and hydroxides of calcium, magnesium, barium, and strontium, to be of particular importance. Finely divided particles of calcium and magnesium silicates produced in this manner have special utility. Other insolubilizing agents which we have found advantageous in our process include oxides, hydroxides and salts of metals in groups Ib to VIII of the periodic table, which have a solubility of at least $1 \times 10^{-5}$ g. in 100 g. of water, such as $Al_2O_3$, $Fe_2O_3$, HgO, SnO, ZnO, CoO, NiO, $As_2O_3$; their salts such as $FeSO_4$, $Al_2(SO_4)_3$, $K_2TiF_6$, $NaAlO_2$, $ZnCl_2$, $CuCl_2$ and $Ti(SO_4)$. It is possible to employ as insolubilizing agents salts of amphoteric metals wherein the metal atoms occur in the anions, i.e. the alkali metal salts of amphoteric acids, with the resulting production of finely divided solid particles which consist of metal silicates. The particles produced are of uniform size and compositions. Excess alkali should be avoided as this may destroy the colloidal nature of the silicate solution. In contrast, if salts of these same metals are employed, wherein the metal is in the cation, the precipitates usually are non-homogeneous mixtures of particles of metal silicate, $SiO_2$ and metal oxide which particles can be distinguished under a high power microscope. Thus, finely divided particles of metal silicates can be obtained in accordance with the present invention by mixing solutions of the alkali metal salts of bismuth, cerium, tantalum, titanium, arsenic, antimony, tin, platinum, gold, iron, tungsten, vanadium, molybdenum, columbium, aluminum, zinc, lead, chromium, and manganese with a protocoacervate of an alkali metal silicate solution. The alkali metal salt used as insolubilizing agent in this procedure can usually be formed in situ, if desired. For example, if litharge is added to the protocoacervate of an alkali metal silicate solution having a pH of at least about 11, the lead oxide will go into solution as sodium plumbate and this will cause a precipitate of finely divided particles of lead silicate. In the absence of the step of forming the protocoacervate, the desired procedures normally produce a curdy or gelatinous precipitate of little or no utility.

The quantity of isolubilizing agent employed should be sufficient to precipitate at least a substantial portion of the silica present in the silicate solution; otherwise the process is not economical. A simple way to test whether sufficient insolubilizing agent has been added is to filter off the precipitate and then to add more insolubilizing agent to the filtrate. If a secondary precipitate is formed in the filtrate this shows that precipitation was originally incomplete. In some cases, of course, it may be advantageous to conduct our process by adding the precipitating agent step-wise and filtering off the precipitate after each addition. In this manner products having exceptionally fine particles of relatively uniform size can be obtained. But if one of our preferred mixing methods is employed, such products can be obtained rather easily in one step. An excess of insolubilizing agent over that required to precipitate all the silica from the mixture can be added if desired. The excess does no harm, it is merely wasted.

The insolubilizing agent can be added simultaneously with the mono-monovalent salt of an alkali metal either by the use of two separate streams or a pre-mixture of the mono-monovalent salt and insolubilizing agent can be used. It is essential, of course, that the mono-monovalent salt be mixed with the silicate solution not later than the insolubilizing agent is mixed therewith since, if the insolubilizing agent is mixed in first, no finely divided particles will be formed but instead there results a gelatinous or curdy mass.

It should be recognized that the metal silicates referred to are not normal stoichiometric compounds but rather non-crystalline amorphous precipitates in which the composition can be duplicated under identical conditions but if the conditions of precipitation are changed, as by changing the proportion of insolubilizing agent to silicate, the ratio of cation to silicate may be changed.

MIXING OF THE REACTANTS

In general the more efficient and the more rapid the mixing, the finer the particles produced. Several continuous mixing techniques are available wherein converging streams or jets of the reactants are employed followed by a continuously filtering off of the precipitate formed. For example, the silicate solution can be continuously mixed in a Y tube with the mono-monovalent salt coacervating agent and this mixture impelled in a jet to be mixed with a jet of the insolubilizing agent. It is also usually possible to mix the mono-monovalent coacervating agent with the insolubilizing agent in a Y tube followed by mixing the resulting mixture in the form of a jet with a jet of the silicate solution. In this latter method, it is evident that the mono-monovalent salt coacervating agent and the insolubilizing agent are mixed with the silicate solution simultaneously and in a predetermined ratio. With the slowly reacting mono-monovalent salt coacervating agent it is possible substantially to increase the proportion in the mixture since the insolubilizing agent effectively stops the coacervating action before it becomes more than partially effective. In the case of some reactants, it is possible to use up to 500% of the quantity of mono-monovalent coacervating agent capable of producing the first appearance of opalescence under equilibrium conditions. Substantially the same results are obtained if the reactants are mixed in three jets.

In all of the mixing techniques mentioned it is evident that during the formation of the ultimate particles the environmental conditions of concentration, temperature, pH and the like are maintained substantially constant. And, as mentioned previously, this is important in obtaining products of the finest particle sizes free from gel. In contrast, if mixing is accomplished by adding the coacervating agent to a beaker containing the silicate solution and the insolubilizing agent is then added slowly under agitating conditions over a period of say from 1 to 20 minutes, the resulting product will contain a substantial proportion of gel and the non-gel portions will consist of particles of widely different sizes. Under these conditions of mixing it is evident that the envorinmental conditions of concentration, pH, temperature, etc., vary substantially from the beginning to the end of the mixing.

The mixing of streams or jets of the reactants in the ways described can, of course, be conducted on a commercial scale, the mixtures produced being passed to a continuous filter of the rotary drum type or being filtered on a moving filter belt, for example. The jet mixing techniques are capable of producing products whose average particle size is less than 20 m$\mu$ down to a minimum of about 7 m$\mu$ and containing less than 0.1% gel.

As described more completely in our co-pending application, S.N. 292,936, now abandoned, it is possible to obtain finely divided products having a particle size below 1 micron by mixing a coacervating agent with a silicate solution in a beaker, for example, and subsequently adding the insolubilizing agent while stirring. If this three-solution mixing technique is used, the insolubilizing agent is added rapidly and must be thoroughly mixed in before the appearance of substantially any irreversible precipitate in the mixture. Otherwise the product will contain considerable amounts of gel. Using this mixing technique the maximum amount of mono-monovalent salt coacervating agent which can be used may amount to 150–200% while the minimum amount of this coacervating agent which can be used is roughly about 50–90% of that required to produce the first appearance of opalescence when added slowly under equilibrium conditions. In this case, we are referring to the sodium silicate solution diluted to the final composition.

REACTANT RELATIONSHIPS

Certain rather well-defined relationships have been established between the three elements involved in our new process, namely the silicate solution, the mono-monovalent salt of the alkali metal solution, and the solution of the insolubilizing agent, and the manner in which these elements are mixed. For the production of the finest particle sizes we have found it essential to add the mono-monovalent salt coacervating agent to the sodium silicate solution before the addition of the insolubilizing agent. Coacervation requires an appreciable time interval and hence it is possible to add an excess of the mono-monovalent salt and then to mix in a solution of the metal compound quickly before the coacervating action has fully become effective. It is also possible and sometimes more convenient to allow the mono-monovalent salt coacervating agent to reach equilibrium, after which the insolubilizing metal compound solution can be added immediately or after the lapse of a time interval. Rapid mixing is usually essential when conditions should be so controlled that the solution is homogeneous before the appearance of the insolubilized metal silicate as a precipitate. Calcium oxide and similar oxides of relatively low solubility must be given time to dissolve and reprecipitate as the more insoluble silicate.

The mono-monovalent salts of the alkali metals are rather slow coacervating agents. Therefore, it is usually necessary to add a considerable excess to the original sodium silicate solution so that sufficient mono-monovalent salt concentration will be present in the final homogeneous solution from which the precipitate separates and to produce rapid agitation of the final homogeneous solution from which the precipitate will separate. This is particularly true if the insolubilizing metal compound is added simultaneously or immediately after the addition of the coacervating agent. No substantial concentration or temperature change should take place during the actual formation of the insoluble particles. In other words, the environmental conditions are maintained substantially constant during the formation of the ultimate particles. This we have found to be highly important in the formation of a product which is free from gel and of uniform particle size.

The temperature at which the reaction is carried out should be controlled. Less of the inorganic mono-monovalent salt coacervating agent is required at higher temperatures while the reverse appears to be true for mono-monovalent salts of organic acids.

Recapitulating, we have found that with mono-monovalent alkali metal salt coacervating agents it is not necessary to halt at incipient coacervation and in fact it is preferred not to do so. It is necessary to have a saturated or nearly saturated salt solution in the final homogeneous solution. Thus, we may add excess salt or even salt crystals to the initial sodium silicate solution causing actual coacervation. The fixing agent is added as an aqueous solution which dilutes the sodium silicate solution and reverses the coacervation to the approximate limit of coacervation or slightly below. The particle size appears to be controlled by the ionic concentration in the final solution taking into account the insolubilizing agent as well as the other salts present. If the ionic concentration is too low, a gel will form. If it is too high, the particles tend to be too large. The effects vary with the salt used i.e. the anions show varying effects on the ionic strength required and on the rapidity of attaining equilibrium.

We have found a rather simple way of testing our finely divided products for the presence therein of gel material. This is done by subjecting the products to a 325 mesh wet screen test after grinding under standard conditions. Any residue left on the screen after the test can be considered gel. This is the same test which has been approved as standard for carbon black and it is known as ASTM test D-185-45; see American Society for Testing Materials Standards for 1949, part 4, page 163. Products produced by the preferred method of the present invention pass this 325 mesh wet screen test leaving a residue on the screen of less than 0.5% and usually less than 0.1%. In some few cases where the insolubilizing metal oxide also forms, the apparent gel residue may be higher. In these cases, we believe that the silica and metal silicate products formed are still free from gel.

Our invention can be described in greater detail by reference to the following specific examples which represent practical operating embodiments of our invention.

Example 1

An aqueous solution of a sodium silicate having a ratio of $Na_2O$ to $SiO_2$ of 1:2 by weight percent and 5% of $Na_2O$ and 10% of $SiO_2$, in the amount of 50 parts by volume was mixed with sodium nitrate crystals until a saturated solution was formed. No haze was observed. To this protocoacervate mixture was added 25 parts by volume of 2 N $FeCl_3.6H_2O$ solution as an insolubilizing agent by pouring the mixture and the solution simultaneously into a single container with a high speed mixer producing high agitation. The resulting slurry was then diluted with water and filtered and the precipitate was washed with 1500 parts by volume of distilled water. The precipitate was dried under an infra-red lamp and then ground. The particle size was determined by the Pechukas and Gage (P and G) method (described in I and E Chemistry, Analytical Edition, 18, 370, 1946), and a wet sieve residue of gel was determinend as indicated above. In this case the specific gravity of the product was found to be 2,339 and the particle size was 46 m$\mu$. By the wet sieve test there was found to be 0.08% gel present.

Example 2

Using the same sequence of steps as in Example 1, 25 parts by volume of a saturated solution of sodium acetate were mixed with 50 parts by volume of a sodium silicate solution containing 10% $SiO_2$ and formed from a silicate having a weight percent ratio of $1Na_2O:2.4SiO_2$ and containing 13.8% $Na_2O$. The resulting protocoacervate was mixed as in Example 1 with 25 parts by volume of a 2 N solution of $Ca(NO_3)_2.4H_2O$. The product was separated and dried as described in Example 1 and it had a specific gravity of 2.24 and a particle size of 30 m$\mu$. There was no wet sieve residue. The analysis of this product was as follows:

| | |
|---|---|
| Ingited loss | 11.69 |
| $SiO_2$ | 65.30 |
| $R_2O_3$ | 0.41 |
| CaO | 22.49 |

Example 3

Using the same technique as in the previous examples, 50 parts by volume of a sodium silicate solution containing 5% $SiO_2$, formed from a solution of sodium silicate having a ratio of $1Na_2O:3.75SiO_2$ by weight and 6.75% of $Na_2O$, were mixed with 8 parts by volume of a saturated solution of sodium nitrate. The resulting protocoacervate was then mixed as before with 40 parts by volume of the 2 N calcium nitrate solution and the residue was separated and dried as previously described. The product had a specific gravity of 2.127 with a particle size of 30 m$\mu$ and a wet sieve test of 0.4% gel.

Example 4

50 parts by volume of a solution of 30% "N" silicate of soda (which is trademarked sodium silicate sold by the Philadelphia Quartz Company having a weight percent ratio of $1Na_2O:3.22SiO_2$ and containing 8.9% $Na_2O$) were treated with 25 parts by volume of sodium chloride brine containing 10% of sodium chloride crystals in excess of saturation to form a coacervate. An insolubilizing agent containing 0.55 part by weight of $Fe_2O_3$ was prepared by adding a slight excess of $NH_4OH$ to a solution containing 1.87 parts by weight of $FeCl_3.6H_2O$ and filtering off the precipitate. This filtrate as insolubilizing agent was mixed with the coacervate thus forming a mixture of a protocoacervate and insolubilizing agent. After agitating the mixture of protocoacervate and insolubilizing agent for 6 hours, the product contained about 75% (of the area of the particles on the microscope slide) brown plates of $Fe_2O_3$, 25 microns in diameter and 25% of $SiO_2$ of about 1 micron in diameter.

If the insolubilizing agent was used without filtration 90% of the particle area was silica of less than 1 micron in diameter. The higher concentration of ferric ions increased the overall ionic strength and thus was helpful in forming fine silica particles.

Example 5

In this example a number of comparative tests were run using different insolubilizing agents. The results obtained are collected in the following table. In each test a protocoacervate was initially formed by adding a solution of saturated sodium chloride brine to 50 parts by volume of a 25% solution of "N" silicate of soda, the quantity of coacervating agent added being just sufficient in each case to form a faint opalescence in the mixture. To the resulting protocoacervate a stoichiometric equivalent of the insolubilizing agent indicated in the first column of the table below was added. The table indicates the particle size of the finely divided precipitate obtained.

| Insolubilizing Agent: | Particle size (Microns) |
|---|---|
| $Sb_2O_4$ | 0.5 |
| $Al_2O_3$ | 10–0.1 |
| $As_2O_3$ | 3–0.3 |
| BaO | 4 |
| $Bi_2O_3$ | 2 |
| CaO | 1 |
| PbO | 5–0.5 |
| MgO | 0.1 |
| HgO | 0.5 |
| SrO | 0.5 |
| SnO | 40–0.1 |
| $Na_2AsO_3$ | 0.5 |
| $Na_2ZnO_2$ | 1 |

Example 6

A number of tests were carried out which illustrated the necessity of building up the ionic strength of the solution and permitting it to reach a satisfactory equilibrium before the insolubilizing agent is added. For instance, with a saturated brine added to the sodium silicate solution and without excess sodium chloride crystals present rapid addition of a salt such as magnesium chloride formed much gel in the precipitate whereas the slow addition of the magnesium chloride produced only a little gel. We believe that this is because the sodium chloride is a slow coacervating agent and we have found that it makes some difference whether the sodium chloride is allowed to age with the sodium silicate before the precipitating ion is added. Apparently when the magnesium chloride is added slowly some gel forms at first but the magnesium chloride itself builds up the ionic concentration sufficiently to prevent the formation of a gel later on. We have found that if we add a saturated solution of sodium chloride containing additional excess crystals of sodium chloride this super-saturated brine and the precipitating salt can be added simultaneously to the sodium silicate without the formation of gel. If such a brine is added prior to the addition of the precipitating salt the solution will actually be coacervated and will not be an opalescent protocoacervate. Therefore, these mono-monovalent alkali metal coacervating agents differ from the other coacervating agents used in our co-pending applications.

Products with a high proportion of gel are, of course, desirable for use as adsorbents or decolorizing agents as required by some inventors in the prior art. However, for use as a filler, pigment or reinforcing agent, such as is required by the present applicants, more dense, lower surface area, non-gelatinous products are much more effective and have been the subject of considerable search by prior art workers.

By using our methods we have been able to obtain precipitates with less than 0.1% gel. We could do this either by allowing the sodium chloride to attain its full equilibrium effect or else by adding excess sodium chloride in a saturated solution. For instance, we used a 3% solution of the previously mentioned "N" silicate of soda diluted with water in the proportion of 100 parts by volume of commercial "N" silicate of soda with 317 parts by volume of water. 100 parts by volume of this diluted silicate solution were mixed with 77 parts by volume of saturated brine (containing approximately 26% NaCl) with 0.08 gram of solid salt crystals added per each part by volume of saturated brine. This composition was mixed thoroughly for one minute and then a solution containing 99 parts by volume of water with 32.9 parts by weight of magnesium chloride $MgCl_2.6H_2O$ was added as quickly as possible with strong agitation. The product was filtered and washed with distilled water in an amount about 20 times the volume of the filter cake. It was dried at 105° C. and less than 0.02% gel was found by our standard test.

The final product of these tests may be boiled but boiling is not required to reduce the gel content while in some samples of the prior art it is apparent that a boiling step is necessary and essential in order to reduce the amount of gel in the mixture. However, for our purposes the boiling step is not required to reduce the gel content since gel formation is avoided initially.

If the magnesium chloride solution was made more concentrated by using only half as much water the product was found to contain 0.2% gel. It is believed that under proper rapid mixing conditions this gel content would have been reduced to the same level as in the previous case.

Example 7

A rubber crumb was prepared loaded with 10% $SiO_2$ by adding 20 parts by volume of a solution containing 25% by weight of "N" silicate of soda to 50 parts by volume of GRS latex (type #3, total solids 38.12%, made by the Naugatuck Chemical Company). This mixture was converted to a protocoacervate by adding saturated sodium chloride brine containing excess sodium chloride crystals and the $SiO_2$ was insolubilized by the addition of calcium chloride equivalent to the $SiO_2$. The product was an intimate mixture of rubber fibers and very finely divided calcium silicate.

Example 8

50 parts by volume of an aqueous solution containing 30% of "N" silicate of soda were formed into a coacervate using 38.5 ml. of saturated brine containing 12.5 grams of NaCl with 10% excess sodium chloride crystals. Using our equilibrium mixing technique, the silicate was mixed with 3 parts by weight of fine cotton fibers. The silica was insolubilized by the addition of zinc chloride equivalent to the silica in the solution and the dried product was recovered. It consisted of cotton fibers 3 to 5 microns wide and 50 to 200 microns long coated evenly with finely divided amorphous zinc silicate. Similar products were formed with asbestos or paper fibers. Other fibrous materials can be used where it is desired to obtain the increased resistance to slippage and other advantages of such surface treatment, or a cloth may be saturated with the brine-soluble silicate solution and then treated with an insolubilizing bath to deposit fine silica in the fibers and prevent slipping.

When potassium silicate is used as the source of soluble silicate, it is usually advantageous to use a potassium salt as the mono-monovalent coacervating agent. This avoids contamination with sodium. However, there may be occasions when it is desirable to mix sodium and potassium ions and this is readily accomplished by using one as the coacervating agent and the other as the source of silicate.

Example 9

In one case a solution of KCl saturated at room temperature and containing 10% of excess undissolved crystals was added to a 25% solution of potassium silicate having a weight ratio of $1K_2O$ to $2.1SiO_2$ and containing 12.45% $K_2O$. A volume of a 33% solution of calcium chloride equivalent to the alkali of the silicate solution was mixed with the said silicate solution using our equilibrium mixing technique. The mixture of potassium silicate and calcium chloride had formed a coacervate which readjusted to a protocoacervate when the diluted calcium chloride solution was added and a finely divided calcium silicate precipitate free of gel was separate from the mixture.

Example 10

A solution containing 84.4% of "N" silicate of soda, 5.8% of sodium chlorate and 9.7% of water formed a coacervate at 20° C. Using our equilibrium mixing technique, an amorphous, very finely divided precipitate of calcium silicate having the approximate formula of $CaO.(SiO_2)_3.xH_2O$ was obtained with a 30% solution of calcium chloride in an amount equivalent to the alkali of the soluble silicate.

Resins or plastic materials which can be dissolved, emulsified, or otherwise dispersed in aqueous solution can be loaded or filled in the same manner as the synthetic rubber and the fibers.

The products of this invention are useful in a large number of industrial applications, in fact they are useful wherever finely divided products can be used. These products have a particle size varying approximately from a few microns down to about 7 millimicrons, the particle size being extremely uniform in a given product.

Probably the most universal use of these products is as fillers for plastics and resins of all types and extenders for fertilizers, insecticides, etc. The products which are colored can be used as pigments in paints, inks, etc. Several of our products are adapted to fine polishing procedures by reason of their fineness, softness and spherical shape. The arsenic silicate products can be used as insecticides. The zinc, magnesium, barium, calcium and lead silicate products can be used as reinforcing agents in the compounding of rubber. Our products can be produced at a cost which is usually considerably below that of other processes now used for producing products of a comparable particle size. In addition our products have the advantage that they can be readily washed free from extraneous matter owing to their excellent filtering properties. They can be obtained in a highly pure condition. For this reason, they can be used as excipients in pharmaceutical preparations and the like. Many other uses for these products will occur to those skilled in the art.

Our process lends itself to the production of filled products of various types. Water soluble resins, for example, can be filled by forming one of our protocoacervates in the presence of a dissolved resin followed by precipitating the resin and the finely divided silicate compound simultaneously by mixing in a mutual insolubilizing compound. Thus sodium rosinate can be dissolved in sodium silicate, the coacervating agent added and coprecipitation produced with an acid-reacting metal salt solution. Polyvinyl alcohol resins can also be filled in this manner. If one of our precipitates is formed in the presence of a finely-divided material, such as paper pulp, asbestos fibers or other fibrous material in suspension, the finely divided precipitate is formed in and on the fibers and the latter become thoroughly impregnated.

While we have described what we consider to be the most advantageous embodiments of our process it is evident, of course, that various modifications can be made in the specific procedures which have been described without departing from the purview of this invention. It is believed obvious from the above description that our process is capable of producing colloidal-sized particles of a large number of metal silicates which may contain metal oxide and/or silica in addition to the metal silicate. Owing to the large number of possible compounds involved and of the many modifications of procedure which may be followed, it is impossible to set out any specific ranges of concentrations, temperatures and the like which are applicable to all cases. Neither is it possible to set out a single specific procedure which would be applicable to the preparation of all of the various possible finely divided products. However, we believe that the foregoing specific examples, coupled with the description of the general principles involved in our invention, will enable those skilled in the art to produce the finely divided products falling within the scope of this invention. A large number of mixing procedures are available which conform to the principles set out. As pointed out previously, in general the more rapid the mixing the more finely divided the products produced. Mixing can be accomplished in conventional mixing tanks by introducing the reactants simultaneously through two or more pipes, if desired, in order to maintain the environmental conditions relatively constant during formation of the precipitate. It is possible to substitute solutions of other alkali metal silicates, such as potassium silicate, for the sodium silicate solutions used in the described processes. Conventional ways of separating the precipitate can be used but it is usually advisable to separate the product promptly after it is formed since there may be a tendency for the particles to agglomerate if they are kept in suspension too long. Further modifications of our process which fall within the scope of the following claims will be immediately evident to those skilled in this art. In the foregoing specification, percentages are by weight unless otherwise specified.

What is claimed is:

1. In the manufacture of finely divided metal silicate products, the process which consists essentially in (a) preparing an aqueous solution of sodium silicate having a weight percent ratio of $Na_2O$ to $SiO_2$ within the range of from about 2:1 to 1:4 and a concentration of $SiO_2$ ranging from about 1 to 30 percent by weight;

(b) mixing said aqueous solution with a mono-monovalent salt in a quantity and under conditions tending to produce a state of incipient coacervation but without the formation of an insoluble precipitate, the incipient coacervation being indicated by the first appearance of a faint opalescence in the mixture;

(c) more than incipient coacervation being prevented by mixing in an aqueous solution of an insolubilizing agent comprising a metal compound which forms an insoluble silicate before the appearance of more than a faint opalescence in the mixture, and completing the mixing in of said insolubilizing agent before precipitation occurs;

(d) the quantity of said insolubilizing agent employed being sufficient to convert at least a substantial proportion of the sodium silicate into an insoluble precipitate and said insolubilizing agent being mixed with the sodium silicate solution no earlier than the mono-monovalent salt is mixed therewith;

(e) maintaining the environmental conditions of concentration, temperature and pH substantially constant during the entrie period of formation of the insoluble precipitate by completing the mixing in of the insolubilizing agent within a period not substantially exceeding 10 seconds, and (f) recovering the resulting finely divided substantially gel-free precipitate.

2. The process according to claim 1 wherein the mono-monovalent salt and insolubilizing agent are added simultaneously to the silicate solution and the mono-monovalent salt being in a quantity amounting to from about 100 to 500% of that which in required, when added sufficiently slowly to permit equilibrium conditions substantially to be established, to produce the first appearance of a faint opalescene in the mixture.

3. The process of claim 1 wherein jet-mixing is employed and a jet of the insolubilizing agent is mixed with jets of the sodium silicate solution and of the mono-monovalent salt.

4. The process of claim 1 wherein the mixing is conducted by mingling streams of the sodium silicate solution, mono-monovalent salt and insolubilizing agent and the finely divided product is continuously filtered from the resulting mixture.

5. The process of claim 1 wherein a finely divided material is present in the final mixture during the formation of the precipitate, whereby the said material becomes impregnated with the finely divided metal silicate product formed in the process.

6. The process of claim 1 wherein rubber latex is present in the mixture during the formation of the precipitate and the insolubilizing agent is one capable of coagulating the latex, whereby a rubber crumb is recovered impregnated with the finely divided metal silicate formed in the process.

7. The process of claim 1 wherein the concentrations of the reactants are adjusted so that the $SiO_2$ concentration in the final mixture is from 0.5 to 8% by weight and wherein the ratio of $Na_2O$ to $SiO_2$ is from 1:2.4 to 1:4.

8. The process according to claim 1 wherein the insolubilizing agent is calcium chloride.

9. The process according to claim 1 wherein the insolubilizing agent is an alkali earth metal salt.

10. The process according to claim 2 wherein the mono-monovalent salt is in a quantity sufficient to produce considerable coacervation of the solution and in such quantity that the final solution containing the insolubilizing agent under equilibrium conditions will be at the point of incipient coacervation.

11. The process according to claim 10 wherein said mono-monovalent salt is added as a saturated solution.

12. The process according to claim 10 wherein said mono-monovalent salt is added as a saturated solution containing excess crystals.

13. The process according to claim 1 wherein the final solution containing the insolubilizing salt under equilibrium conditions will have an ionic strength of about 0.15 to 0.4 depending upon the concentration of silica in the final solution.

References Cited in the file of this patent

UNITED STATES PATENTS

| 2,485,287 | Henson et al. | Oct. 18, 1949 |
| 2,498,353 | Bierce | Feb. 21, 1950 |
| 2,754,547 | Allen | July 17, 1956 |

OTHER REFERENCES

Mellor: "A Comprehensive Treatise on Inorganic and Theoretical Chemistry, vol. 6, pp. 323, 324 (1925), Longmans, Green and Co., London.